US012730460B2

(12) United States Patent
Strief

(10) Patent No.: US 12,730,460 B2
(45) Date of Patent: Sep. 8, 2026

(54) SYSTEMS AND METHODS FOR PREDICTIVE PLANT ROW CLEANER AUTOMATION

(71) Applicant: CNH Industrial America LLC, New Holland, PA (US)

(72) Inventor: Jeremy Martin Strief, Bettendorf, IA (US)

(73) Assignee: CNH Industrial America LLC, New Holland, PA (US)

( * ) Notice: Subject to any disclaimer, the term of this patent is extended or adjusted under 35 U.S.C. 154(b) by 278 days.

(21) Appl. No.: 18/536,955

(22) Filed: Dec. 12, 2023

(65) Prior Publication Data

US 2025/0189995 A1 Jun. 12, 2025

(51) Int. Cl.

| | |
|---|---|
| ***G05D 3/10*** | (2006.01) |
| ***G05D 105/15*** | (2024.01) |
| ***G05D 107/20*** | (2024.01) |
| ***G05D 111/50*** | (2024.01) |

(52) U.S. Cl.

CPC ........... *G05D 3/10* (2013.01); *G05D 2105/15* (2024.01); *G05D 2107/21* (2024.01); *G05D 2111/52* (2024.01)

(58) Field of Classification Search

CPC .. G05D 3/10; G05D 2105/15; G05D 2107/21; G05D 2111/52; A01C 7/205; A01C 7/006; A01C 21/00; A01B 79/005; A01B 17/002; A01B 33/08; A01B 33/16; A01B 35/16; A01B 41/06; A01B 49/02; A01B 63/002; A01B 63/008; A01B 71/066; A01B 79/02; E02F 9/2029; G05B 15/02

See application file for complete search history.

(56) References Cited

U.S. PATENT DOCUMENTS

| | | | | |
|---|---|---|---|---|
| 11,266,056 | B2 | 3/2022 | Nair et al. | |
| 2017/0112043 | A1* | 4/2017 | Nair | A01B 33/16 |
| 2020/0352081 | A1 | 11/2020 | Arnett et al. | |
| 2021/0007266 | A1 | 1/2021 | Stoller et al. | |
| 2021/0059110 | A1* | 3/2021 | Goering | A01C 7/006 |
| 2022/0174855 | A1* | 6/2022 | Zielke | A01C 5/066 |
| 2024/0057507 | A1* | 2/2024 | Miller | A01B 63/008 |
| 2024/0138281 | A1* | 5/2024 | Lovett | G05D 1/246 |

* cited by examiner

*Primary Examiner* — Nga X Nguyen

(74) *Attorney, Agent, or Firm* — Fletcher Yoder, PC

(57) ABSTRACT

A system may include a row cleaner configured to apply a pressure to a field and a work vehicle coupled to the row cleaner and configured to traverse through the field, where the work vehicle comprising an engine configured to adjust a speed of the work vehicle. The system may also include a sensor configured to provide sensor data indicative of the field and a controller comprising a memory and a processor, where the controller is communicatively coupled to the row cleaner, the engine, and the sensor. The controller may provide an instruction to adjust the pressure applied by the row cleaner, the speed of the engine, or both based on the sensor data.

20 Claims, 4 Drawing Sheets

CONTROLLER
MEM
μP
USER INTERFACE
INPUT ASSEMBLY
DISPLAY
A
S
S

SYSTEMS AND METHODS FOR PREDICTIVE PLANT ROW CLEANER AUTOMATION

BACKGROUND

The present disclosure relates generally to systems and methods for predictive plant row cleaner automation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a seeding implement is towed behind a tractor or other work vehicle for planting operations. The seeding implement typically includes multiple row units distributed across the width of the seeding implement. Each row unit is configured to deposit seeds at a target depth beneath the soil surface of a field, thereby establishing rows of planted seeds. For example, each row unit typically includes a ground engaging tool (e.g., an opener disc) that forms a seeding path (e.g., trench) for seed deposition into the soil. In certain configurations, a gauge wheel is positioned a vertical distance above the opener disc to establish a desired trench depth for seed deposition into the soil. In certain instances, the field includes residue from a previous harvest, which may prevent the opener disc from reaching the desired trench depth and/or the seeding implement from creating a clean, consistent seedbed.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a system may include a row cleaner configured to apply a pressure to a field and a work vehicle coupled to the row cleaner and configured to traverse through the field, where the work vehicle comprising an engine configured to adjust a speed of the work vehicle. The system may also include a sensor configured to provide sensor data indicative of the field and a controller comprising a memory and a processor, where the controller is communicatively coupled to the row cleaner, the engine, and the sensor. The controller may provide an instruction to adjust the pressure applied by the row cleaner, the speed of the engine, or both based on the sensor data.

In other embodiments, a system may include a work vehicle including an engine and configured to traverse through a field in a direction of travel, the engine configured to adjust a speed of the work vehicle, an implement coupled to the work vehicle, and the implement comprising a row unit configured to exert a pressure to a soil surface of the field. The system may also include a sensor coupled to the implement and configured to provide sensor data indicative of field conditions of the soil surface in a forward direction with respect to the direction of travel and a controller comprising a memory and a processor. The controller may be communicatively coupled to the engine, the row unit, and the sensor. The controller may determine an amount of residue based on the sensor data indicative of the field conditions and provide an instruction to adjust the speed of the engine, the pressure applied by the row unit, or both based on the sensor data.

Still in other embodiments, a system may include a row unit comprising a row cleaner blade, the row cleaner blade configured to apply a downward force to a soil surface, a work vehicle coupled to the row unit, the work vehicle comprising an engine configured to adjust a speed of the work vehicle, and a controller comprising a memory and a processor where the controller is communicatively coupled to the row unit and the engine. The controller may receive an operator input indicative of target operating parameters, the target operating parameters comprising a target speed of the work vehicle, a target downward force applied by the row cleaner blade, or both, receive a signal indicative of operating parameters of the work vehicle or the row cleaner blade, where the operating parameters comprising the speed of the work vehicle or the downward force applied by the row cleaner blade, and instruct the work vehicle or the row cleaner blade to adjust the operating parameters based on a comparison between the target operating parameters and the operating parameters.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
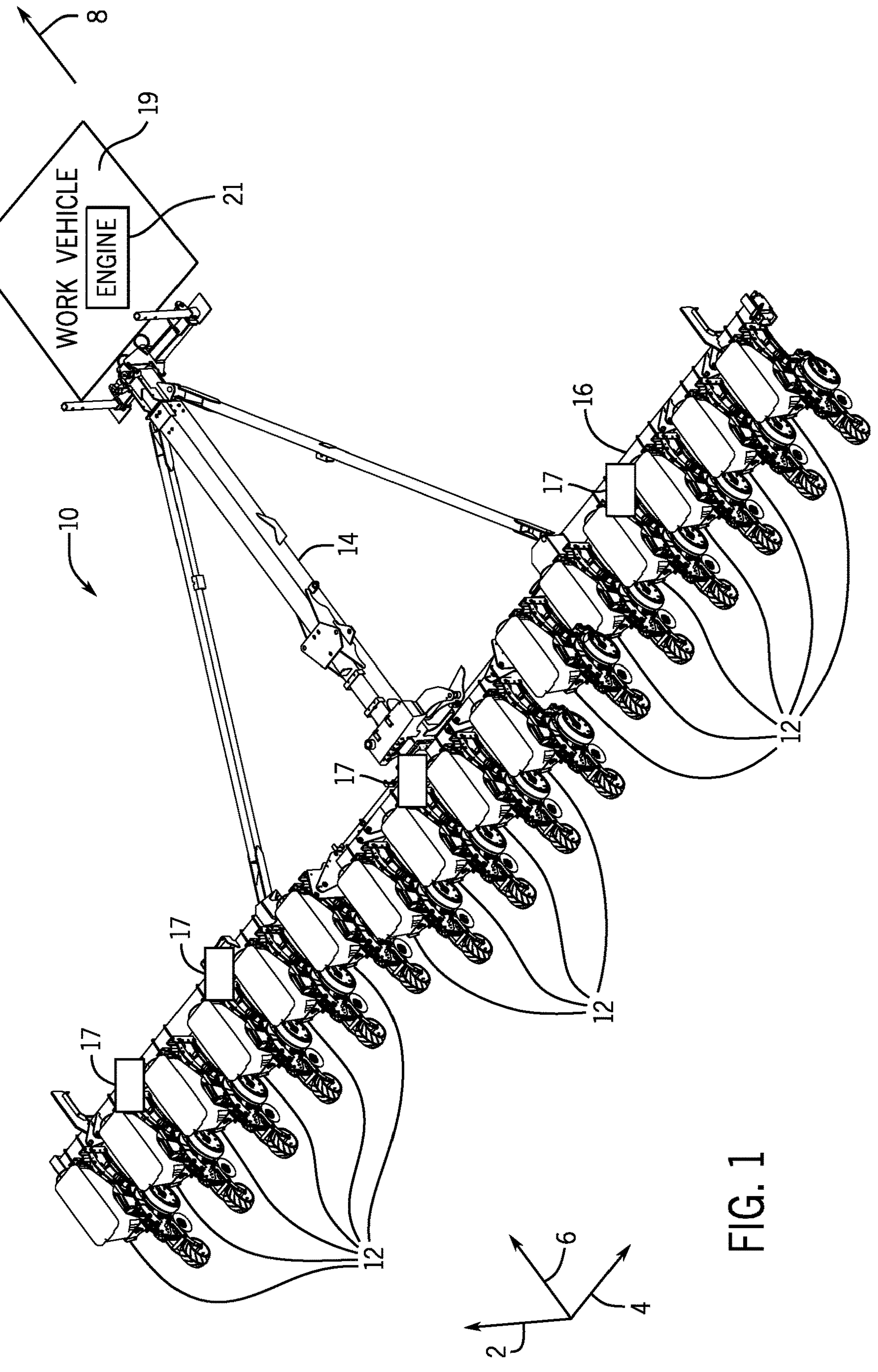
FIG. 1 is a perspective view of an embodiment of an agricultural implement.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles “a,” “an,” “the,” and “said” are intended to mean that there are one or more of the elements. The terms “comprising,” “including,” and “having” are intended to be inclusive and mean that there may be additional elements other than the listed elements. Any examples of operating parameters and/or environmental conditions are not exclusive of other parameters/conditions of the disclosed embodiments.

As used herein, machine learning may refer to algorithms and statistical models that computer systems may use to perform a specific task with or without using explicit instructions. For example, a machine learning process may generate a mathematical model based on a sample of clean data, known as "training data," in order to make predictions or decisions without being explicitly programmed to perform the task. In another example, the machine learning process may use image analysis to determine objects of interest based on a sample of clean data or based on preferences by a user, in order to make predications or decisions without being explicitly programmed to perform the task.

The present disclosure is related to an agricultural system, and more specifically to improving a planting operation performed by a work vehicle and/or an implement. For example, the work vehicle tows a seeding implement (e.g., agricultural implement) through a field to till the soil, level the soil, plant seeds, and the like. However, the field may include obstacles, such as residue (e.g., crop residue) left-over from previous harvests, rocks, weeds, hills, and the like, which impact the planting operation. For example, certain areas of the field include higher amounts (e.g., percentage, concentration) of residue in comparison to other areas of the field that include lower amounts of residue. If the seeding implement traverses through the areas of high residue too fast, the residue can cause at least portions of the seeding implement to bounce. As a result, the residue may not be properly broken up (e.g., removed), which may cause an opener disc not to reach a desired trench depth. Alternatively, if the seeding implement traverses through the areas of low residue slowly, the planting operation may decrease in efficiency. As such, it may be beneficial for the work vehicle to dynamically adjust operating parameters during the planting operation.

In certain embodiments disclosed herein, the seeding implement may be at least partially automated (e.g., partially independent of human control) to perform the planting operation. For example, the work vehicle and/or the seeding implement are coupled to and/or integrated with a controller that dynamically adjusts the operating parameters of the work vehicle and/or the seeding implement. To this end, the controller includes a machine learning model and/or an artificial intelligence algorithm that is trained based on training data. The training data may include stored image data, stored harvest data, stored satellite data, stored operator inputs, or any combination thereof.

The controller predicts field conditions across the entire field and/or a portion of the field based on sensor data from forward-facing sensors (e.g., with respect to a direction of travel), rearward-facing sensors (e.g., with respect to the direction of travel), historical (e.g., previous) harvest data, satellite data, weather conditions, operator inputs, or any combination thereof. For example, the controller receives sensor data indicative of field conditions preceding the row unit from one or more sensors coupled to the row unit and facing the direction of travel. The controller may, via the machine learning model, determine (e.g., predict) the field conditions from the sensor data and dynamically adjust the operating parameters of the work vehicle and/or the seeding implement based on the determined field conditions. The field conditions may include an amount of residue, a number of rocks, a topography change, and the like. If the sensor data is indicative of a high amount of residue, the controller instructs an engine of the work vehicle to decrease speed and/or one or more row unit(s) of the seeding implement to increase pressure. If the sensor data is indicative of a low amount of residue, the controller instructs the engine to increase speed and/or the row unit to decrease pressure. That is, the controller implements a machine learning model and/or an artificial intelligence algorithm to aid in determining the amount of residue within a portion of the field preceding the seeding implement and dynamically adjusting the operating parameters based on the amount of residue. As such, the controller may adjust operating parameters of the work vehicle and/or the seeding implement during travel through the field and without additional operator input.

Additionally or alternatively, the controller receives satellite data indicative of the field and/or historical harvest data to determine (e.g., predict) the amount of residue within the field. The satellite data may include images of the field (e.g., taken at one or more times, such as a time prior to the planting operation and/or without any intervening planting or harvesting operations), and the images may indicate a topography of the field, an amount of residue in the field, or any combination thereof. The historical harvest data may include one or more historical maps, and the one or more historical maps may indicate the amount of residue from one or more previous harvests (e.g., subsequent to and/or due to one or more previous harvests; prior to the planting operation). The controller performs analysis of the satellite data and/or the historical harvest data to generate a map indicative of the residue, such as areas of high residue and/or areas of low residue. In certain embodiments, the map may be an initial map (e.g., predictive map, prescription map, residue map, created prior to the planting operation) that identifies expected or predicted residue based on the satellite data and/or the historical harvest data, and the initial map be utilized to facilitate the planting operation. For example, based on the initial map, the controller may determine and set the operating parameters (e.g., initial target operating parameters) for the work vehicle and/or the seeding implement in the areas of high residue and/or the areas of low residue. In such cases, the controller may then receive the sensor data during the planting operation, update the map indicative of the residue based on the sensor data, and/or adjust the operating parameters for the work vehicle and/or the seeding implement in the areas of high residue and/or the areas of low residue (e.g., to account for the sensor data obtained during the planting operation, which may indicate different areas and/or levels of residue compared to the initial map, such as due to wind, inaccuracies in the satellite data, and so forth). However, it should be appreciated that in certain embodiments, the sensor data, the satellite data, and/or the historical harvest data may be analyzed together during the planting operation to identify the amount of residue, to determine presence within the areas of high residue and/or the areas of low residue, as well as to adjust the operating parameters for the work vehicle and/or the seeding implement accordingly. The controller may instruct a display within the work vehicle to display the map and the operating parameters prior to the planting operation and/or during the planting operation. As such, the operator may view the map and/or the operating parameters prior to the planting operation and/or during the planting operation. In certain embodiments, the operator may accept, decline, and/or adjust the operating parameters. In certain embodiments, the controller may use the operator inputs to train the machine learning model.

During the planting operation, the controller receives location data indicative of a position of the work vehicle and/or the seeding implement within the field and instructs the work vehicle and/or the seeding implement to adjust operating parameters based on a comparison between the location data and the map. In an embodiment, the controller instructs a display within the work vehicle to display the map and/or the adjusted operating parameters and prompts the operator for input prior to the adjustment. In other embodiments, the controller dynamically adjusts the operating parameters without additional operator inputs. As such, the planting operation may be improved.

FIG. 1 is a perspective view of an embodiment of an agricultural implement 10 (e.g., seeder). To facilitate discussion, the agricultural implement 10 and its components may be described with reference to a vertical axis or direction 2, a lateral axis or direction 4, a longitudinal axis or direction 6. Further, the agricultural implement 10 is configured to travel in a forward direction of travel 8. The agricultural implement 10 is designed to be towed behind a work vehicle, such as a tractor. The agricultural implement 10 includes a tongue assembly 12 which is shown in the form of an A-frame hitch assembly. The tongue assembly 12 may include a hitch used to attach to an appropriate tractor hitch via a ball, clevis, or other suitable coupling. For example, a tongue of the agricultural implement 10 may be connected to a drawbar of the work vehicle, or a mast of the agricultural implement 10 may be connected to a three-point hitch of the work vehicle. The tongue assembly 12 is coupled to a toolbar 14, which supports multiple seeding implements or row units 16. While the illustrated agricultural implement 10 includes 16 row units in one row for illustrative purposes, the agricultural implement 10 may include any suitable number of row units and any suitable number of rows. For example, the agricultural implement 10 may include 5, 10, 15, 20, 25, 30, or more row units in a first row and a corresponding number of row units in a second row. Additionally or alternatively, the row units 16 within the second row may be laterally offset (e.g., offset in the lateral direction 4 perpendicular to the forward direction of travel 8) from a respective row unit of the first row.

The row units 16 are configured to deposit agricultural product into the soil. For example, certain row units 16 (e.g., all of the row units 16, a portion of the row units 16, at least one row unit 16) include an opener assembly having an opener disc rotatably coupled to a frame (e.g., chassis) of the row unit 16 and configured to engage with the soil to form a trench. The opener assembly also includes a gauge wheel configured to rotate across a soil surface to control a penetration depth of the opener disc into the soil. In addition, the opener assembly includes an opener depth control cylinder (e.g., actuator) extending between the frame and the gauge wheel. The opener depth control cylinder is configured to control the penetration depth of the opener disc by varying position of the gauge wheel relative to the frame. For example, increasing a pressure exerted by the opener depth control cylinder may increase a distance between the gauge wheel and the frame, thereby increasing the penetration depth of the opener disc. Additionally or alternatively, decreasing a pressure exerted by the opener depth control cylinder may decrease a distance between the gauge wheel and the frame, thereby decreasing the penetration depth of the opener disc. In certain embodiments, the agricultural implement 10 includes a depth control system configured to automatically control the penetration depth of the opener discs of the row units 16 and/or the pressure exerted by the opener depth control cylinder.

Additionally or alternatively, certain row units 16 include a closing disc coupled to the row unit frame at a horizontal distance behind the opener disc relative to the forward direction of travel 8. The closing disc is rotatably coupled to the row unit frame and configured to direct displaced soil into the trench. The closing depth of the closing disc may be similar to the penetration depth of the opener disc. The closing depth is controlled by a closing depth control actuator (e.g., cylinder) configured to position the closing disc at the closing depth below the soil surface. In certain embodiments, the depth adjustment system is also configured to control the closing depths of the closing discs of the row units 16.

In certain instances, the opener disc of the row units 16 is preceded by a row cleaner assembly configured to remove and/or break up residue (e.g., crop residue, debris). The row cleaner assembly may include a row cleaner arm pivotally coupled to the row unit frame; however, it should be appreciated that the row cleaner arm may be coupled (e.g., directly attached) to another structure, such as the toolbar 14. Indeed, because the row unit 16 may move up and down during the planting operation, it may be advantageous to couple the row cleaner arm to the toolbar 14 to provide independent movement of the row cleaner assembly and the opener disc.

The row cleaner assembly also includes at least one row cleaner blade (e.g., toothed disc, spiked wheel, mini-hopper) rotatably coupled to the row cleaner arm and a row cleaner actuator coupled to the row unit frame and the row cleaner arm. The row cleaner actuator is configured to control a pressure (e.g., downward force) applied by the at least one row cleaner blade to the soil. Additionally or alternatively, the row cleaner actuator is configured to control the contact force between the at least one row cleaner blade and the soil substantially independently of the contact force between the gauge wheel and the soil. For example, each contact force may be adjusted for particular field conditions (e.g., soil composition, soil moisture, residue depth, residue amount). As a result, the row cleaner assembly disclosed herein may enable more efficient and/or effective planting operations. For example, the at least one row cleaner blade may remove and/or break up the debris, which may reduce clogs at the opener discs, which in turn may reduce or eliminate breaks in the planting operation used to remove clogs at the opener discs.

The agricultural implement 10 may include one or more sensor(s) 17 to determine the field conditions. The one or more sensor(s) 17 are positioned forward-looking (e.g., facing) with respect to the forward direction of travel 8 of the work vehicle and/or rearward-looking with respect to the forward direction of travel 8 of the work vehicle. The one or more sensor(s) 17 include a capacitive sensor, an optical sensor, a camera, a light detection and ranging (LIDAR) sensor, a proximity sensor, an ultrasound sensor, a radar sensor, a pressure sensor, a sonar sensor, a location sensor (e.g., global positioning system (GPS) sensor), an accelerometer sensor, a speed (e.g., velocity) sensor, a position sensor, or any combination thereof. The one or more sensor(s) 17 may couple to the frame of the row unit 16, the row cleaner arm, and/or another structure near the opener discs, the closer discs, the row cleaner blade, or any combination thereof. Additionally or alternatively, the one or more sensor(s) 17 may couple to the toolbar 14, the work vehicle, and the like.

For example, the one or more sensor(s) 17 include a camera coupled to the toolbar 14 and/or a frame of the row unit 16 and facing the forward direction of travel 8 to provide sensor data indicative of a portion of the field and/or corresponding field conditions prior to deposition of a seed at the portion of the field. That is, the sensor data is indicative of the portion of the field and/or the corresponding field conditions directly preceding or forward of the row units 16. Additionally or alternatively, the one or more sensor(s) 17 include a camera coupled to a structure near the closer discs and facing a direction opposite the forward direction of travel 8 to provide sensor data indicative of the portion of the field and/or corresponding field conditions after the deposition of the seed at the portion of the field. In another example, the one or more sensor(s) 17 includes a pressure sensor disposed within the opener depth cylinder, the closing depth actuator, the row cleaner actuator, or any combination thereof. The pressure sensor provides sensor data indicative of the pressure being exerted by the opener depth cylinder, the closing depth actuator, or the row cleaner actuator, respectively. To facilitate discussion, FIG. 1 includes a schematic representation of a work vehicle 19 with an engine 21 that provides motive force to drive wheels or tracks of the work vehicle 19 to move the work vehicle 19 through the field.

Figure 2:
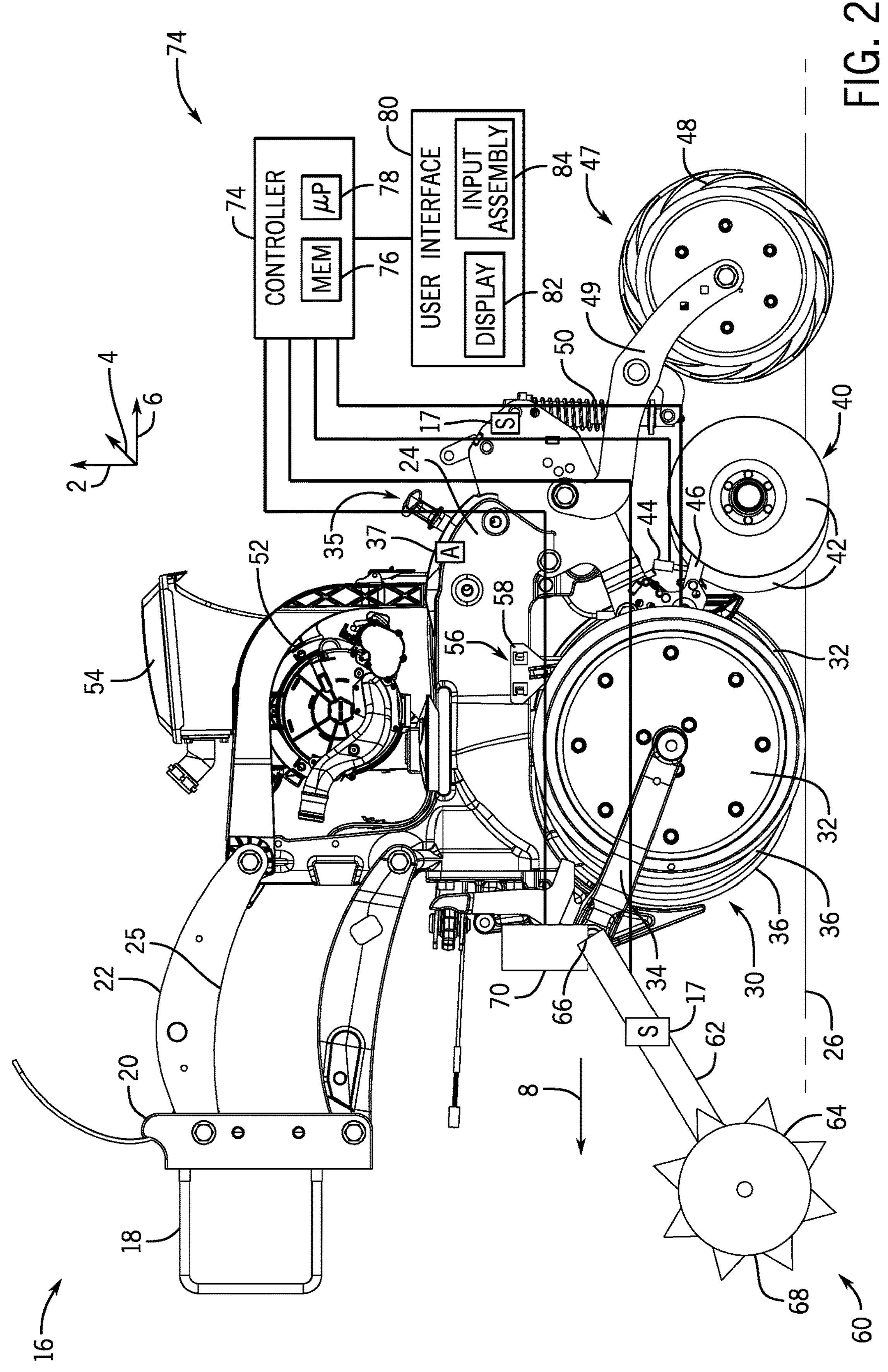
FIG. 2 is a side view of an embodiment of a row unit that may be employed within the agricultural implement of FIG. 1.

FIG. 2 is a side view of an embodiment of a row unit 16 (e.g., agricultural row unit) that may be employed within the agricultural implement 10. The row unit 16 includes a mount 18 configured to secure the row unit 16 to the toolbar 14 of the agricultural implement 10. In the illustrated embodiment, the mount 18 includes a U-bolt that secures a bracket 20 of the row unit 16 to the toolbar 14. However, in alternative embodiments, the mount 18 includes another suitable device that couples the row unit 16 to the toolbar 14. A row unit linkage assembly 22 extends from the bracket 20 to a frame 24 of the row unit 16. The row unit linkage assembly 22 is configured to enable vertical movement of the frame 24 relative to the toolbar 14 in response to variations in a soil surface 26. In certain embodiments, a down pressure system 25 (e.g., including a hydraulic actuator, a pneumatic actuator) is coupled to the row unit linkage assembly 22 and configured to urge the frame 24 toward the soil surface 26. While the illustrated row unit linkage assembly 22 is a parallel linkage assembly (e.g., a four-bar linkage assembly), in other embodiments, another suitable linkage assembly may extend between the bracket 20 and the frame 24.

The row unit 16 is configured to deposit seeds and/or other agricultural product(s) at a desired depth beneath the soil surface 26 as the row unit 16 traverses the field along the forward direction of travel 8. The row unit 16 includes an opener assembly 30 that forms a trench in the soil for seed/other agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are rotatably coupled to the frame 24 and configured to excavate a trench into the soil, and the gauge wheels 32 are configured to control the penetration depth of the opener discs 36 into the soil. In the illustrated embodiment, the row unit 16 includes a depth control system 35 configured to control the vertical position of the gauge wheels 32 (e.g., by blocking rotation of the arms 34 in the upward direction beyond a selected orientation), thereby controlling the penetration depth of the opener discs 36 into the soil. The depth control system 35 includes an actuator 37 configured to control the penetration depth of opener discs 36 and an actuator 38 configured to control the penetration depth of closing discs 42. It should be appreciated that any other suitable depth adjustment assembly/device, such as a biasing member, and/or a depth adjustment handle, may be used to control the vertical position of the gauge wheel/penetration depth of the opener discs 36. The row unit 16 also includes an agricultural product conveying system (e.g., seed tube or powered agricultural product conveyor) configured to deposit seeds and/or other agricultural product(s) (e.g., fertilizer) into the trench.

The opener assembly 30 and the agricultural product conveying system are followed by a closing assembly 40 that moves displaced soil back into the trench. In the illustrated embodiment, the closing assembly 40 includes two closing discs 42, an actuator 44, and a closing link 46 that pivotally couple the closing discs 42 to the frame 24 of the row unit 16. The closing discs 42 engage with the soil and are driven to rotate as the row unit 16 moves along the forward direction of travel 8. While the closing assembly 40 includes two closing discs 42 in the illustrated embodiment, in other embodiments, the closing assembly may include more or fewer closing discs (e.g., 1, 3, 4, or more). The actuator 38 (e.g., hydraulic actuator, pneumatic actuator) is coupled to the frame 24 and the closing link 39. The actuator 38 is configured to control the vertical position of the closing discs 42, thereby controlling the closing depth of the closing discs 42 beneath the soil surface 26. While the illustrated example includes the actuator 38, it should be appreciated that any other suitable depth adjustment assembly/device, such as a biasing member, and/or a depth adjustment handle, may be used to control the vertical position of the closing discs 42.

In the illustrated embodiment, the closing assembly 40 is followed by a packing assembly 47 configured to pack soil on top of the deposited seeds and/or other agricultural product(s). The packing assembly 47 includes a packer wheel 48, an arm 49 that pivotally couples the packer wheel 48 to the frame 24, and a biasing member 50 configured to urge the packer wheel 48 toward the soil surface 26, thereby enabling the packer wheel to pack soil on top of the deposited seeds and/or other agricultural product(s). While the illustrated biasing member 50 includes a spring, in other embodiments, the biasing member may include another suitable biasing device, such as a hydraulic cylinder or a pneumatic cylinder, among others. Furthermore, in certain embodiments, the packing assembly may be omitted.

The row unit 16 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in other embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 16 includes a scraper assembly 56 disposed adjacent to the opener disc 36 and configured to remove accumulated soil from the opener disc 36. The scraper assembly 56 may be coupled directly to the frame 24, or the scraper assembly 56 may be mounted to another suitable mounting structure. The scraper assembly 56 includes an outer scraper 58 (e.g., first outer scraper) coupled to the frame 24 and configured to engage an outer surface of an opener disc 36 (e.g., first disc). Furthermore, in certain embodiments, the scraper assembly 56 includes an inner scraper (e.g., first inner scraper) configured to engage an inner surface of the opener disc 36. Furthermore, in certain embodiments, the scraper assembly 56 may include a second inner scraper and a second outer scraper configured to remove accumulated soil from a second opener disc 36 of the row unit 16. In certain embodiments, any or all of the scrapers disclosed above may be omitted.

The row unit 16 also includes a row cleaner assembly 60 configured to remove and/or break up residue (e.g., crop residue, debris) in front of the opener disc 36 to reduce or eliminate clogs of the opener disc 36. The row cleaner assembly 60 includes a row cleaner arm 62 pivotally coupled to the frame 24 and a row cleaner blade 64 rotatably coupled to the row cleaner arm 62. As illustrated, the row cleaner arm 62 is pivotally coupled to the frame 24 at a pivot joint 66 (e.g., first pivot joint), and the row cleaner arm 62 positions a rotational axis 68 of the row cleaner blade 64 forward of a rotational axis of the opener disc 36 relative to the forward direction of travel 8. The row cleaner blade 64 is configured to remove and/or break up residue (e.g., crop residue), thereby creating a clean, consistent seedbed for the planting operation. In other words, the row cleaner blade 64 is configured to clear a path and improve an ability of the opener disc 36 to form the trench for the planting operation. In the illustrated embodiment, the row cleaner blade 64 includes radially-extending (e.g., outwardly-extending) spikes or teeth. However, in other embodiments, the row cleaner blade 64 may be devoid of the spikes or teeth (e.g., smooth). Furthermore, the row cleaner assembly 60 may include any suitable number of row cleaner blades 64 (e.g., 1, 2, 3, 4, or more). Thus, the row cleaner assembly 60 may include a single row cleaner blade, or the row cleaner assembly 60 may include additional row cleaner blade(s) (e.g., distributed along the direction of travel and/or positioned side-by-side). For example, a first row cleaner blade and a second row cleaner blade may be laterally offset from one another to be positioned side-by-side at an end portion of the row cleaner arm 62 (e.g., rotatably mounted on an axle at the end portion of the row cleaner arm 62). In addition, the rotational axis 68 of the row cleaner blade 64 may be oriented at any suitable angle relative to the forward direction of travel 8 to facilitate removing and/or breaking up the residue. When multiple row cleaner blades are provided, the respective rotational axes 68 may be the same (e.g., aligned, coaxial) or different (e.g., angled with respect to one another, such as to form a v-shape; laterally and/or longitudinally offset with respect to one another). In certain embodiments, the angle of the row cleaner blade 64 (e.g., the rotational axis of the row cleaner blade 64) relative to the forward direction of travel 8 and/or the vertical axis 2 may be adjustable (e.g., via an actuator; based on operator input and/or based on sensor data, such as sensor data indicative of field characteristics).

In the illustrated embodiment, the row cleaner assembly 60 includes a row cleaner actuator 70 (e.g., fluid actuator, hydraulic cylinder, hydraulic motor, pneumatic cylinder, pneumatic motor) coupled to the row cleaner arm 62 and to the frame 24. The row cleaner actuator 70 is configured to control a downward force applied by the row cleaner blade 64 to the soil surface 26. Accordingly, the downward force applied by the row cleaner blade 64 is increased by adjusting (e.g., increasing a pressure, fluid pressure) within the row cleaner actuator 70, and the downward force applied by the row cleaner blade 64 is decreased by adjusting (e.g., decreasing the pressure) within the row cleaner actuator 70. In certain embodiments, a valve assembly may be fluidly coupled to the row cleaner actuator 70 and configured to control fluid pressure within the row cleaner actuator 70, thereby controlling the downward force applied by the row cleaner blade 64 to the soil surface 26. In other embodiments, the extension of the row cleaner actuator 70 causes the row cleaner arm 62 to move downwards relative to the frame 24, thereby increasing the downward force applied by the row cleaner blade 64. Additionally or alternatively, retraction of the row cleaner actuator 70 causes the row cleaner arm 62 to move upwards relative to the frame 24 and decreases the downward force applied by the row cleaner blade 64. In this way, the pressure exerted by the row unit 16 may be adjustable.

In addition, the agricultural implement 10 includes a monitoring system 72 configured to determine an amount of residue within the field and/or a portion of the field and determine operating parameters based on the amount of residue. To this end, the monitoring system 72 includes a controller 74 with a memory device 76 and a processor 78, such as a microprocessor. The processor 78 executes software, such as software for determining the amount of residue and/or determining the operating parameters of the work vehicle and/or the row units 16. For example, the processor 78 executes image analysis techniques, a machine learning model, and/or an artificial intelligence algorithm to determine (e.g., predict) the amount of residue and determine (e.g., predict or set) the speed of the work vehicle (e.g., a target or desirable speed of the work vehicle; appropriate for the amount of residue), a pressure exerted by the row cleaner blade 64 (e.g., a target or desirable pressure to be applied by the row cleaner blade 64; appropriate for the amount of residue), or both. In another example, the processor 78 may generate a map with areas of high residue and areas of low residue. Moreover, the processor 78 may include multiple microprocessors, one or more "general-purpose" microprocessors, one or more special-purpose microprocessors, and/or one or more application specific integrated circuits (ASICS), or some combination thereof. For example, the processor 78 may include one or more reduced instruction set (RISC) or complex instruction set (CISC) processors.

The memory device 76 may include a volatile memory, such as random access memory (RAM), and/or a nonvolatile memory, such as read-only memory (ROM). The memory device 76 stores a variety of information and may be used for various purposes. For example, the memory device 76 stores processor-executable instructions (e.g., firmware or software) for the processor 78 to execute, such as instructions for determining the amount residue, determining the speed of the work vehicle, the pressure exerted by the row units 16, or any combination thereof. In addition, the memory device 76 stores image analysis techniques, machine learning model(s) and/or artificial intelligence algorithm(s) used to determine the amount of residue within the field and/or the soil surface 26 and determine (e.g., predict) operating parameters for the planting operation. That is, the memory device 76 stores instructions for autonomously controlling the agricultural implement 10, the work vehicle, operating parameters, and so on. The memory device 76 may also store historical harvest data, previous planting operations, a map and/or location data for autonomously instructing the implement, and/or a map including areas of high residue and areas of low residue. The storage device(s) (e.g., nonvolatile storage) may include ROM, flash memory, a hard drive, or any other suitable optical, magnetic, or solid-state storage medium, or a combination thereof. The storage device(s) may store data (e.g., sensor data, historical harvest data, stored satellite data, stored operating parameters), instructions (e.g., software or firmware for controlling the monitoring system 72), and any other suitable data. The processor 78 and/or the memory device 76, and/or additional processor(s) and/or memory device(s), may be located in any suitable portion(s) of the agricultural implement 10 and/or the work vehicle.

In certain embodiments, the monitoring system 72 receives sensor data from the one or more sensor(s) 17 and uses image analysis techniques to determine the amount of residue within a portion of the field forward of the row unit 16 and prior to deposition of the seed at the portion of the field. As illustrated, the one or more sensor(s) 17 includes a camera positioned on the row cleaner arm 62 and faces the forward direction of travel 8. As such, the one or more sensors(s) 17 provides sensor data indicative of field conditions of a portion of the field prior to the row unit 16 traversing over the portion. Although the illustrated sensor(s) 17 is positioned on the row cleaner arm 62, the one or more sensor(s) 17 may also be positioned on the bracket 20, the frame 24, the closing link 46, and the like. For example, the one or more sensor(s) 17 may be positioned on the closing link 46 facing a direction opposite the forward direction of travel 8 and provide sensor data indicative of field conditions rearward of the row unit 16.

In certain embodiments, the monitoring system 72 uses the sensor data to determine the amount of residue, such as the percentage of residue, the depth of the residue, and the like. Additionally or alternatively, the monitoring system 72 may use the sensor data to determine the presence of obstacles, such as rocks, small animals, topography change, and the like. Based on the determination, the monitoring system 72 outputs a signal to adjust the pressure exerted by the row unit 16 and/or the speed of the work vehicle. For example, the monitoring system 72 may instruct the row cleaner actuator 70 to increase pressure to cause the row cleaner blade 64 to increase the downward force exerted on the soil surface 26. Additionally or alternatively, the monitoring system 72 may instruct the row cleaner actuator 70 to decrease the pressure to cause the row cleaner blade 64 to decrease the downward force exerted on the soil surface 26. The monitoring system 72 may instruct an engine of the work vehicle to increase or decrease rotations per minute (rpm) to adjust the speed of the work vehicle and/or the agricultural implement 10 traversing through a portion of the field. In this way, the monitoring system 72 may improve planting operations.

Additionally or alternatively, the monitoring system 72 receives sensor data from one or more sensor(s) 17 facing a direction opposite the forward direction of travel 8. The sensor data may be indicative of field conditions rearward of the row unit 16 and after deposition of the seed at the portion of the field. The monitoring system 72 is configured to use the sensor data to verify and/or validate aspects of the planting operation, which may indicate whether the operating parameters resulted in desirable or target planting parameters. For example, the monitoring system 72 uses image analysis techniques to determine an amount of residue (e.g., cleared or chopped residue, as compared to prior to travel over the portion of the field and/or prior to deposition of the seed at the portion of the field), an angle of the soil surface 26, a position of the trench, coverage of the seed, and the like. The monitoring system 72 may use the sensor data to train the machine learning model, which may result in improved algorithms to predict the amount of residue, to determine the operating parameters that provide improved planting operations, and so forth.

Additionally or alternatively, the monitoring system 72 receives satellite data from a communication network (e.g., satellite network, non-terrestrial network) and uses the satellite data to adjust the operating parameters. The satellite data may include weather data (e.g., weather patterns, predicted weather, current weather), topography data of the field (e.g., elevation), image data of the field in various wavelengths (e.g., visible light, infrared, microwave, radio waves), location data, or any combination thereof. It should be appreciated that the satellite data may include or represent use of any type of field-wide image data, such as images of an entirety of the field or portions of the field via aerial vehicles (e.g., drones, airplanes, satellites) or any suitable vehicle that is separate from the work vehicle and the agricultural implement 10. For example, the monitoring system 72 uses the satellite data to monitor crop health, predict crop yields, determine the amount of residue, and the like. In another example, the monitoring system 72 uses the satellite data to determine a topography of the field, the amount of residue within respective areas of the field, such as areas of high residue, areas of low residue, and the like. The satellite data may include a top-down view (e.g., bird's eye view) of the field and the monitoring system 72 may use image analysis techniques to determine the areas of high residue and the areas of low residue. For example, the areas of high residue may appear lighter in color in comparison to the areas of low residue. In another example, the monitoring system 72 may determine a percentage of residue within each area and compare the percentage to a value to determine the areas of high residue and areas of low residue. During the planting operation, the monitoring system 72 adjusts the operating parameters based on a determination of the work vehicle is in the area of high residue or the area of low residue. For example, the monitoring system 72 is configured to instruct the row unit 16 to increase pressure and/or the work vehicle to decrease speed based on a determination of the work vehicle entering a high residue area and/or leaving a low residue area. In another example, the monitoring system 72 is configured to instruct the row unit 16 to decrease pressure and/or the work vehicle to increase speed based on a determination of the work vehicle entering a low residue area and/or leaving the high residue area.

Additionally or alternatively, the monitoring system 72 uses both the satellite data and historical harvest data (e.g., stored in the memory device 76 or any accessible database) to adjust the operating parameters. For example, the monitoring system 72 is configured to merge the satellite data and the historical harvest data to determine the areas of high residue and the areas of low residue. The map (e.g., initial map) may include a label, a percentage, a value, a residue level, or the like for the areas of high residue and/or the areas of low residue on the map. The monitoring system 72 is configured to generate the map of the residue levels and display the map.

To this end, the monitoring system 72 includes a user interface 80 configured to receive operator inputs and present visual and/or graphical data to the operator (e.g., including a representation of the map with the labeled areas of high residue and/or areas of low residue). In the illustrated embodiment, the user interface 80 includes an input assembly 82 and a display 84. The user interface 80 is configured to receive one or more inputs, such as operator inputs (e.g., accept adjustment, decline adjustment, change adjustment), planting operation inputs (e.g., the pressure of the row unit 16, speed of the work vehicle, target penetration depth for the opener discs 36, target penetration depth for the closer discs 42), operation inputs (e.g., initiate planting operations, generate or update the map prior to planting operations), other suitable inputs, or a combination thereof, and the user interface 80 is configured to output signal(s) indicative of the input(s) to the controller 74. The input assembly 82 may include one or more buttons, switches, knobs, or a combination thereof, for the operator to input commands and/or instructions, which may be presented on the display 84. For example, the operator may press a button of the input assembly 82 to view the map, input operating parameters, initiate the planting operation, pause the planting operation, accept adjusted operating parameters, decline adjusted operating parameters, or any combination thereof. The display 84 is configured to present information to the operator, such as a graphical representation of the field, the operating parameters in real-time (or near-real time), adjusted operating parameters, or any combination thereof. In certain embodiments, the display 84 may include a touchscreen interface that enables the operator to control certain parameters (e.g., the pressure exerted by the row unit 16, the downward force exerted by the row cleaner blade 64, the extension of the row cleaner actuator 70, the speed of the work vehicle, a number of rotations of the engine of the work vehicle) associated with the operation of the agricultural implement 10 and/or the work vehicle during the planting operation.

By way of example, to initiate the planting operation, the operator may use the input assembly 82 to select a button to start the planting operation. Additionally or alternatively, the operator may input one or more operating parameters to the user interface 80 indicative of an operator target pressure of the row units 16, an operator target speed of the work vehicle, and the like. The operator may also input a respective operator target pressure and/or a respective operator target speed for areas of high residue and/or areas of low residue. In some such cases, the monitoring system 72 is configured to receive the operator target operating parameters and initiate the planting operation by instructing the row unit 16 and/or the work vehicle based on the operator target operating parameters. Then, as the work vehicle moves the row unit 16 through the field, the monitoring system 72 adjusts the operating parameters according to the operator target operating parameters, the sensor data, the satellite data, and/or the historical harvest data to thereby provide appropriate or desirable operating parameters to account for operator preference and/or the amount of residue across the field (e.g., respective amounts of residue in different areas of the field). In this way, the monitoring system 72 is configured to dynamically adjust the operating parameters of the row unit 16 and/or the work vehicle during the planting operation. As noted herein, in certain embodiments, the monitoring system 72 may analyze the satellite data and/or the historical harvest data to determine (e.g., predict) the amount of residue in the field, generate the map (e.g., the initial map), and determine the target operating parameters (e.g., the initial target operating parameters). In some such cases, the operator may provide the operator input to initiate the planting operation. Then as the work vehicle moves the row unit 16 through the field, the monitoring system 72 may adjust the operating parameters according to the target operating parameters. Upon receipt of sensor data from the one or more sensor(s) 17 that indicates that the amount of residue varies from the predicted amount of residue (e.g., reflected in the initial map), the monitoring system 72 may adjust the operating parameters accordingly. In this way, the monitoring system 72 includes an initial set of the target operating parameters based on the satellite data and/or the historical harvest data, which may be adjusted as new information is received (e.g., the sensor data and/or the operator input).

During the planting operation, the monitoring system 72 is configured to receive sensor data from the one or more sensor(s) 17 indicative of field conditions of a portion of the field forward of the row cleaner blade 64. The monitoring system 72 is configured to determine the amount of residue in the portion of the field and determine operating parameters based on the amount of residue. In an embodiment, the monitoring system 72 is configured to instruct the display 84 to display the operating parameters and prompt the operator for input before implementing the operating parameters. For example, the operator may use the input assembly 82 to indicate accepting the adjusted operating parameters, declining the adjusted operating parameters, and/or adjusting the adjusted operating parameters. The monitoring system 72 is configured to store the operator input and/or use the operator input to train the machine learning model for subsequent adjustments. In other embodiments, the monitoring system 72 is configured to dynamically adjust the operating inputs without additional operator input.

In addition, the monitoring system 72 is configured to receive a signal indicative of the operating parameters from the one or more sensor(s) 17, the row unit 16, and/or the work vehicle and compare the operating parameters to the target operating parameters. The one or more sensor(s) 17 includes a pressure sensor configured to provide sensor data indicative of the pressure exerted by the row cleaner actuator 70, which may be used to determine the downward force (e.g., pressure) exerted by the row cleaner blade 64 to the soil surface 26. If the operating parameter is outside a range (e.g., input operating parameter±tolerance value), the monitoring system 72 is configured to dynamically adjust the respective operating parameter without additional operator input. For example, the monitoring system 72 may instruct the row unit 16 to increase or decrease the pressure and/or the work vehicle to increase or decrease speed. In an embodiment, the monitoring system 72 is configured to instruct the display 84 to display the adjustment (e.g., increase or decrease in pressure, increase or decrease in speed) and prompt the operator for additional input before instructing the row unit 16 and/or the work vehicle to adjust the operating parameters. The monitoring system 72 is configured to store the operator input in the memory device 76 and/or use the operator input to train the machine learning model. As such, future adjustments may be improved.

Additionally or alternatively, the monitoring system 72 is configured to instruct the display 84 to display a graphical representation of the map with the varying levels of residue. The operator may use the input assembly 82 to indicate when and/or where to make the adjustments to the operating parameters. For example, the operator may select a portion of the field indicated as an area of high residue and input adjusted operating parameters via the input assembly 82 and/or the display 84. The adjusted operating parameters may include a decreased speed for the work vehicle and/or increased pressure for the row unit 16. In this way, the operator may select or provide their preference for adjusting speed and/or the pressure during the planting operations. For example, the operator may prefer to increase the pressure rather than decrease the speed, or the operator may prefer to increase the pressure only up to a certain threshold and then decrease the speed. In another example, the operator may select a portion of the field indicated as an area of medium residue and input adjusted operating parameters. Still in another example, the operator may select a portion of the field indicated as an area of low residue and adjust the operating parameters.

The monitoring system 72 described herein may be installed in both new and existing seeding implements. Installation of the monitoring system 72 includes disposing of one or more sensor(s) 17 onto or within the row unit 16 (e.g., onto or within the row cleaner actuator 70). For example, the one or more sensor(s) 17 may be secured to the actuator 38 via various interface and mounting features, such as fasteners, tab extensions, etc.

Figure 3:
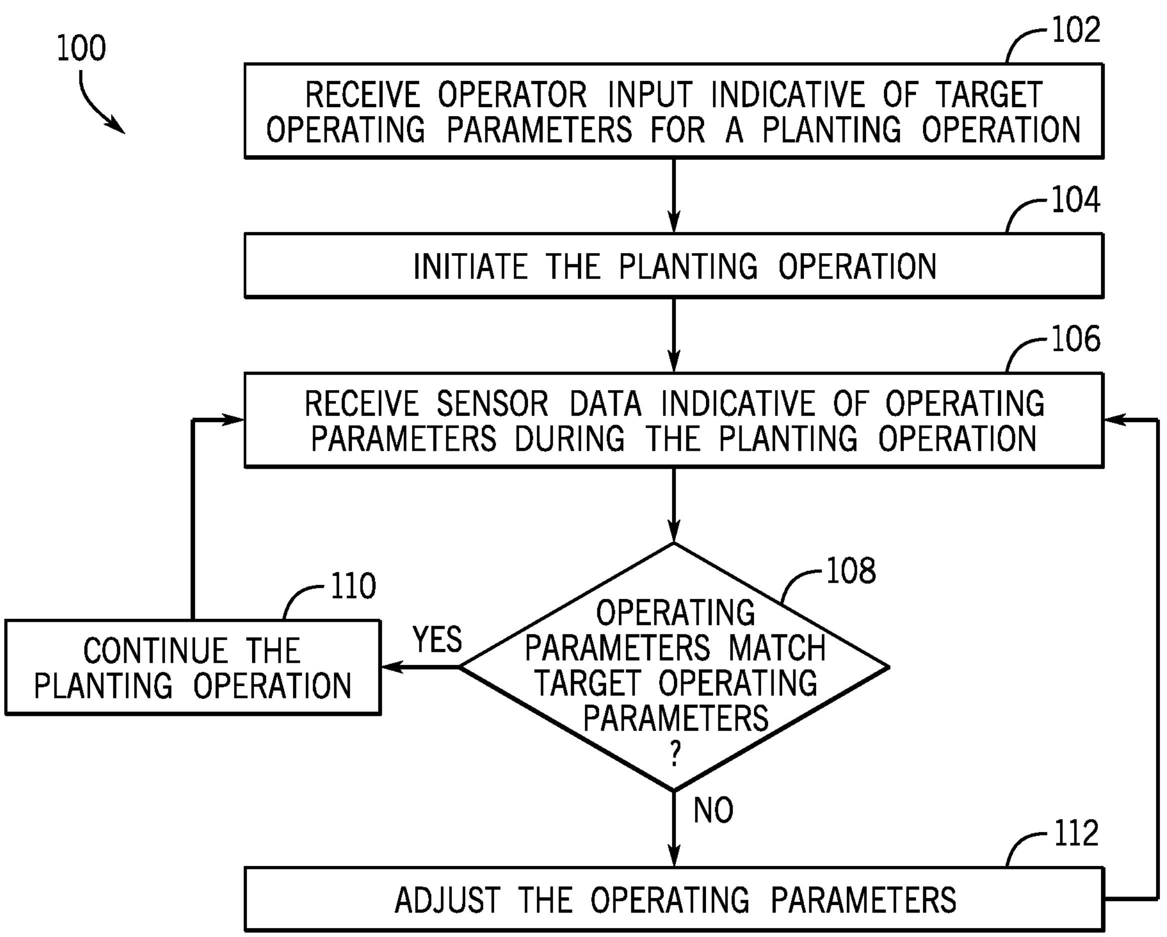
FIG. 3 is a flowchart of an example method for operating the agricultural implement of FIG. 1 based on target operating parameters.

FIG. 3 is a flowchart of an example method 100 for operating the agricultural implement 10 based on target operating parameters. For example, the operator may input target operating parameters for the row unit and/or the work vehicle within the areas of high residue, the areas of low residue, during the planting operation, and the like. During the planting operation, the monitoring system 72 is configured to receive operating parameters from the one or more sensor(s) and adjust the operating parameters based on a comparison between the target operating parameters to the operating parameters. In this way, the monitoring system 72 may improve row cleaner efficiency and/or the planting operation.

At block 102, the controller receives operator input indicative of target operating parameters for the planting operation. The operator inputs one or more target operating parameters via the input assembly and/or the display. For example, the operator may select an operating speed for the work vehicle, an operating pressure for the row unit 16, or a combination thereof. Additionally or alternatively, the operator views the graphical representation of the map on the display and selects different target operating parameters for each portion of the field. The portions of the field may be labeled as areas of high residue and/or areas of low residue. The controller is configured to receive the operator input and instruct the work vehicle and/or the row unit to initiate planting operations based on the target operating parameters. It should also be appreciated that the target operating parameters may additionally or alternatively be determined based on other types of data, such as satellite data and/or historical harvest data (e.g., which indicates or may be analyzed to predict distribution of residue over the field during the planting operation).

At block 104, the controller initiates the planting operation. The controller is configured to initiate the planting operation based on the target operating parameters. For example, the controller is configured to instruct the engine of the work vehicle to operate at the target speed and/or the row cleaner blade to apply the target pressure. In certain instances, the controller is configured to update the graphical representation of the map with an indicator of the work vehicle and/or movement of the work vehicle throughout the field. In this way, the operator may view the graphical representation and understand the position of the work vehicle within the field, such as the position of the work vehicle relative to the areas of high residue and/or areas of low residue.

At block 106, the controller receives sensor data indicative of operating parameters during the planting operation. For example, the controller is configured to receive sensor data from a forward-facing sensor indicative of an amount of residue forward of the row unit. For example, the controller is configured to receive sensor data from a rearward-facing sensor indicative of a dirt pattern and determine the pressure exerted by the row unit and/or speed of the work vehicle based on the dirt pattern. The controller may implement machine learning techniques and/or an artificial intelligence algorithm to determine the operating parameters from the sensor data. In another example, the controller is configured to receive sensor data from a pressure sensor coupled to the row cleaner actuator and determine the downward force exerted by the row cleaner blade. As described herein, the sensor data may be utilized as training data for the machine learning techniques.

At block 108, the controller determines if the operating parameters match the target operating parameters. For example, the controller compares the operating speed and/or the operating pressure to the target operating parameters. In certain instances, the input parameters may include a tolerance value and the controller may determine if the operating parameters are within a range (input operating parameter±tolerance value). The tolerance value for the speed parameter may include ±1 mph, ±5 mph, ±10 mph, or the like. As discussed herein, the target operating parameters may change based on the field conditions. The controller is configured to receive location data of the work vehicle within the field and determine if the work vehicle is disposed within an area of high residue and/or an area of low residue. If the work vehicle is within the area of high residue, the controller is configured to compare the operating parameters with the target operating parameters corresponding to the area of high residue. If the work vehicle is within the area of low residue, the controller configured to compare the operating parameters with the target operating parameters corresponding to the area of low residue.

If the operating parameters match the target operating parameters, at block 110, the controller continues the planting operation. The method 100 may then return to block 106 to receive sensor data indicative of the operating parameters and proceed to block 108 to determine if the operating parameters match the input parameters.

If the operating parameters do not match the target operating parameters, at block 112, the controller adjusts the operating parameters. For example, the operating parameters may be greater than or less than the target parameters. In another example, the operating parameters may be outside an acceptable range (input parameter±tolerance value). For example, the controller instructs the vehicle to increase or decrease pressure, increase or decrease speed, and the like.

The method described above may be stored on one or more tangible, non-transitory, machine-readable media and/or may be performed by the processor of the controller described above with reference to FIG. 3 or on another suitable controller. The steps of the method 100 may be performed in the order disclosed above or in any other suitable order. Furthermore, certain steps of the method may be omitted. It should be appreciated that machine learning techniques may be implemented in the method 100, such as to determine the target operating parameters, assess images to determine the amount of residue across the field, adjust the operating parameters, and so forth.

Figure 4:
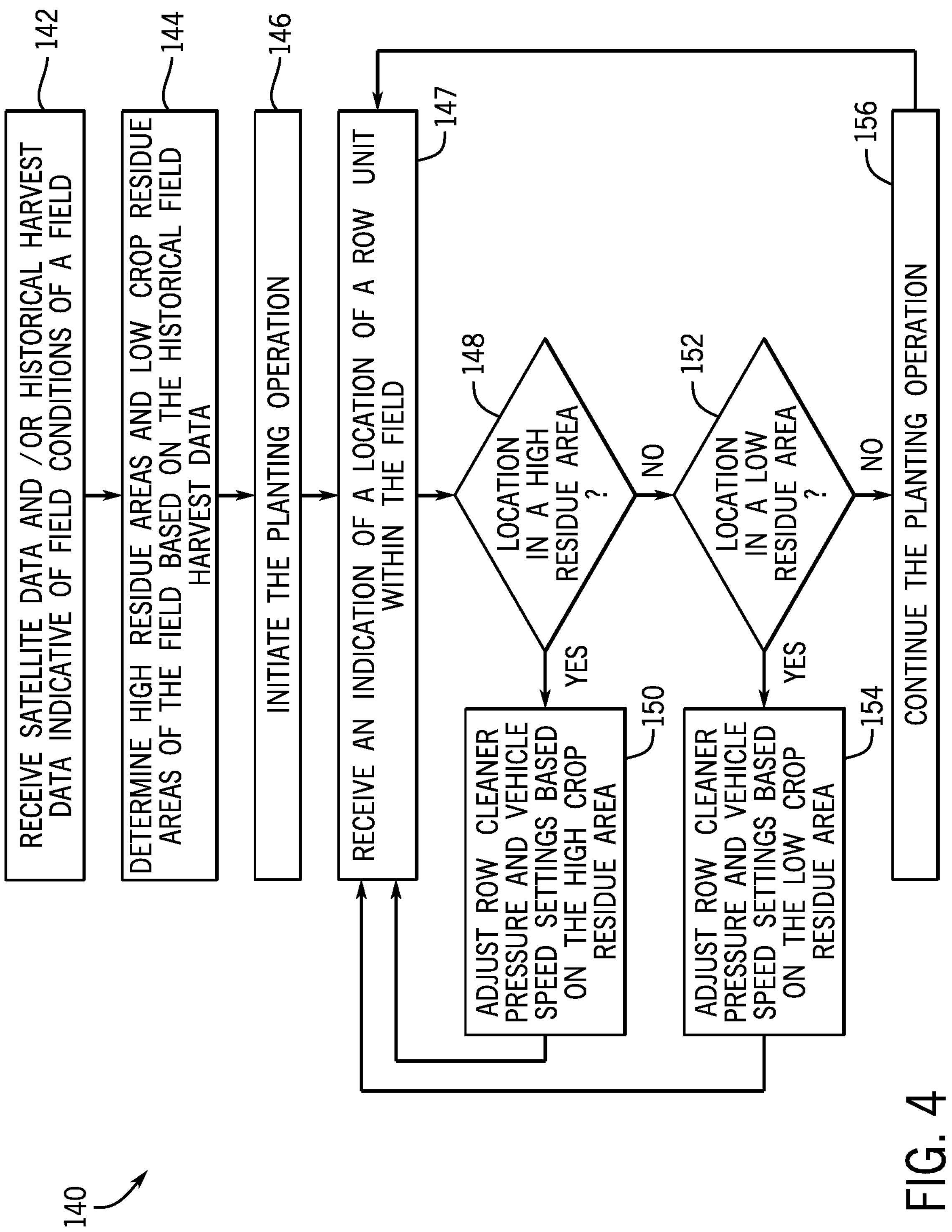
FIG. 4 is a flowchart of an example method for adjusting an operating parameter of the agricultural implement of FIG. 1 based on location data.

FIG. 4 is a flowchart of an example method 140 for adjusting an operating parameter of the agricultural implement based on location data. For example, the controller is configured to receive satellite data and/or historical harvest data and determine (e.g., predict) field conditions based on the satellite data and/or the historical harvest data. The controller is configured to use a machine learning model and/or artificial intelligence algorithms to determine areas of high residue and/or areas of low residue within the satellite data and/or the historical harvest data. Additionally or alternatively, the controller is configured to receive sensor data indicative of field conditions preceding the row unit 16 and adjust the operating parameters based on the field conditions.

At block 142, the controller receives satellite data and/or historical harvest data indicative of field conditions of a field. The satellite data and/or the historical harvest data may include stored sensor data (e.g., image data) obtained during planting and/or harvest operations at respective previous times (e.g., previous months and/or years), stored satellite data obtained at respective previous times (e.g., previous months and/or years; prior to, during, and/or after the planting and/or the harvest operations at the previous times), previous yield data, previous weather conditions, and so on. For example, the historical harvest data may include data obtained after a previous harvest operation under similar conditions, such as rainfall, sunlight, temperatures, and the like. The controller is configured to predict residue leftover from a most recent previous harvest operation based on the historical harvest data.

At block 144, the controller determines areas of high residue and areas of low residue within the field based on the satellite data and/or the historical harvest data. For example, the controller is configured to use the satellite data and/or the historical harvest data to determine (e.g., predict) the field conditions for the planting operation. The controller is configured to determine the field conditions based on an analysis of the satellite data and the historical harvest data.

At block 146, the controller initiates the planting operation. In an embodiment, the controller receives an operator input via the display indicative of a request to initiate the planting operation. As described herein, the controller may determine target operating parameters (e.g., initial target operating parameters) based on the satellite data and/or the historical harvest data. More particularly, the controller may determine the target operating parameters based on distribution of residue across the field (e.g., respective target operating parameters for the high residue areas and the low residue areas), as indicated by the satellite data and/or the historical harvest data. Accordingly, the controller instructs the row unit and/or the work vehicle to initiate the planting operation with the target operating parameters. It should be appreciated that the operator may provide additional operation input to accept, decline, and/or adjust the target operating parameters.

At block 147, the controller receives an indication of a location of a row unit within the field. For example, the controller is configured to receive location data indicative of the location (e.g., position) of each respective row unit within the field. As discussed herein, the row units span the width of the agricultural implement, which may cover a portion of the field and/or multiple portions of the field with varying field conditions. To this end, the controller may determine a respective location for each of the row units. Additionally or alternatively, the controller is configured to receive location data indication of the location of the work vehicle within the field and determine the respective location of each row unit based on the location of the work vehicle.

At block 148, the controller determines if the location of the row unit is within a high residue area. The controller is configured to compare the location of the row unit with the map to determine if the location of the row unit is within the area of high residue. Additionally or alternatively, the controller may determine if each respective row unit is within the high residue area, outside of the high residue area, within a low residue area, and the like.

If the row unit location is within the high residue area, then at block 150, the controller may adjust the row cleaner pressure and/or work vehicle speed settings based on the high residue area. For example, the controller is configured to instruct the row unit to increase the pressure exerted to break up the residue in the area of high residue. Additionally or alternatively, the controller is configured to instruct the work vehicle to decrease speed to provide the row unit additional time to break up the residue.

If the row unit location is not within the high residue area, then at block 152, the controller may determine if the location of the work vehicle is within a low residue area. The controller is configured to compare the location of the row unit to the map to determine if the location is within the area of low residue.

If the row unit location is within the low residue area, then at block 154, the controller may adjust row cleaner pressure and/or work vehicle speed settings based on the low residue area. For example, the controller is configured to instruct the row unit to decrease the pressure exerted to break up the residue in the area of low residue. Additionally or alternatively, the controller is configured to instruct the work vehicle to increase speed to improve operating efficiency.

If the row unit location is not within the low residue area, then at block 156, the controller may continue the planting operation. In certain instances, a portion of the row units may be located in the area of high residue, while a portion of the row units may be located in an area of low residue. In certain embodiments, the controller is configured to individually instruct the row units to adjust the operating parameter based on the location of the row unit, thereby creating a clean, consistent seedbed for the opener assembly, the closing assembly, or both. However, in certain embodiments, the controller may be configured to instruct the row units in sections or groups (e.g., sets of 2, 3, 4, 5, 6, or more).

It should be appreciated that, at block 147, sensor data from one or more sensors may indicate the amount of residue forward of a row unit during the planting operation, and the controller may update the target operating parameters based on the amount of residue indicated by the sensor data (e.g., to account for differences between expected field conditions predicted based on the satellite data and/or the historical harvest data and actual field conditions indicated by the sensor data). In such cases, each row unit may include a respective one or more sensors to facilitate individual control of the row units; however, it is also envisioned that sections or groups of row units may be controlled together (e.g., based on one or more sensors shared by a group of row units). Additionally or alternatively, the operator may provide additional operation input to adjust the target operating parameters during the planting operation.

The method described above may be stored on one or more tangible, non-transitory, machine-readable media and/or may be performed by the processor of the controller described above with reference to FIG. 4 or on another suitable controller. The steps of the method 140 may be performed in the order disclosed above or in any other suitable order. Furthermore, certain steps of the method may be omitted. It should be appreciated that machine learning techniques may be implemented in the method 140, such as to determine the target operating parameters, assess images to determine the amount of residue across the field, and so forth.

While only certain features have been illustrated and described herein, many modifications and changes will occur to those skilled in the art. It is, therefore, to be understood that the appended claims are intended to cover all such modifications and changes as fall within the true spirit of the disclosure. It should be appreciated that features shown or described with reference to FIGS. 1-4 may be combined in any suitable manner.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:

a row cleaner configured to apply a pressure to a field;

a work vehicle coupled to the row cleaner and configured to traverse through the field, the work vehicle comprising an engine configured to adjust a speed of the work vehicle;

a sensor configured to provide sensor data indicative of the field during a current planting operation; and a controller comprising a memory and a processor, wherein the controller is communicatively coupled to the row cleaner, the engine, and the sensor, and the controller is configured to:

retrieve historical harvest data of the field, wherein the historical harvest data is indicative of an amount of residue within the field from a previous planting operation associated with a weather condition;

predict respective areas of high residue and respective areas of low residue during the current planting operation based on the historical harvest data and based on a current weather condition associated with the current planting operation corresponding to the weather condition associated with the previous planting operation; and provide an instruction to adjust the pressure applied by the row cleaner, the speed of the engine, or both during the current planting operation based on the respective areas of high residue and the respective areas of low residue.

2. The system of claim 1, wherein the controller is configured to:

receive satellite data of the field from a communication network; and provide the instruction to adjust the pressure applied by the row cleaner, the speed of the engine, or both during the current planting operation based on the satellite data and the historical harvest data.

3. The system of claim 1, comprising a display communicatively coupled to the controller, wherein the controller is configured to:

instruct the display to display a map of the field with the respective areas of high residue and the respective areas of low residue.

4. The system of claim 1, wherein the controller is configured to:

receive a location of the work vehicle within the field during the current planting operation; and provide the instruction to increase the pressure applied by the row cleaner, decrease the speed of the engine, or both during the current planting operation in response to determining the location is within a threshold distance of one of the respective areas of high residue.

5. The system of claim 1, wherein the controller is configured to:

receive a location of the work vehicle within the field during the current planting operation; and provide the instruction to decrease the pressure applied by the row cleaner, increase the speed of the engine, or both during the current planting operation in response to determining the location is within a threshold distance of one of the respective areas of low residue.

6. The system of claim 1, comprising a display communicatively coupled to the controller and configured to receive user input indicative of an input pressure, an input speed, or both.

7. The system of claim 6, wherein the controller is configured to:

receive an indication of the pressure applied by the row cleaner, the speed of the engine, or both; and provide the instruction to adjust the pressure applied by the row cleaner based on a respective comparison between the input pressure and the pressure, the speed of the engine based on a respective comparison between the input speed and the speed, or both.

8. The system of claim 1, wherein the sensor is forward facing with respect to a direction of movement of the work vehicle through the field.

9. A system comprising:

a work vehicle comprising an engine and configured to traverse through a field in a direction of travel during a current planting operation, the engine configured to adjust a speed of the work vehicle;

an implement coupled to the work vehicle, the implement comprising a row unit configured to exert a pressure to a soil surface of the field during the current planting operation;

a sensor coupled to the implement and configured to provide sensor data indicative of field conditions of the soil surface in a forward direction with respect to the direction of travel; and a controller comprising a memory and a processor, wherein the controller is communicatively coupled to the engine, the row unit, and the sensor, and the controller is configured to:

retrieve historical harvest data of the field, wherein the historical harvest data is indicative of an amount of residue within the field from a previous planting operation associated with a weather condition;

determine a predicted amount of residue within the field during the current planting operation based on the historical harvest data and based on a current weather condition associated with the current planting operation corresponding to the weather condition associated with the previous planting operation; and provide an instruction to adjust the speed of the engine, the pressure applied by the row unit, or both based on the predicted amount of residue within the field.

10. The work vehicle of claim 9, wherein the work vehicle comprises a display, wherein the controller is configured to:

receive satellite data of the field;

generate a map comprising expected field conditions of the soil surface based on the satellite data, the historical harvest data, or both, wherein the field conditions are indicative of respective areas of high residue and respective areas of low residue;

determine a respective target speed, a respective target pressure, or both for each of the respective areas of high residue and the respective areas of low residue; and instruct the display to display the map and the respective target speed, the respective target pressure, or both for the each of the respective areas of high residue and the respective areas of low residue.

11. The work vehicle of claim 10, wherein the controller is configured to:

receive the sensor data indicative of the field conditions as the work vehicle traverses through the field;

determine that a location of the work vehicle is within one of the respective areas of high residue or the respective areas of low residue based on the sensor data, the satellite data, and the historical harvest data; and provide an instruction to adjust the speed to the respective target speed, the pressure to the respective target pressure, or both based on the location.

12. The work vehicle of claim 9, wherein the work vehicle comprises a display, and wherein the controller is configured to:

receive operator input indicative of an operator target speed;

receive an indication of the speed of the work vehicle; and adjust the speed based on a comparison between the operator target speed and the indication.

13. A system, comprising:

a row unit comprising a row cleaner blade, the row cleaner blade configured to apply a downward force to a soil surface;

a work vehicle coupled to the row unit, the work vehicle comprising an engine configured to adjust a speed of the work vehicle during a current planting operation; and a controller comprising a memory and a processor, wherein the controller is communicatively coupled to the row unit and the engine, and the controller is configured to:

retrieve historical harvest data of a field, wherein the historical harvest data is indicative of an amount of residue within the field from a previous planting operation associated with a weather condition;

determine a predicted amount of residue within the field during the current planting operation based on the historical harvest data and based on a current weather condition associated with the current planting operation corresponding to the weather condition associated with the previous planting operation; and instruct the work vehicle to adjust the speed, the row cleaner blade to adjust the downward force, or both based on the predicted amount of residue within the field.

14. The system of claim 13, comprising a first sensor facing a direction of travel and configured to provide first sensor data indicative of field conditions prior to the current planting operation, wherein the field conditions comprise a detected amount of residue.

15. The system of claim 14, comprising a second sensor facing a direction opposite the direction of travel and configured to provide second sensor data indicative of field conditions after the current planting operation.

16. The system of claim 13, wherein the historical harvest data is indicative of field conditions from the previous planting operation, wherein the field conditions are indicative of respective areas of high residue within the field and respective areas of low residue within the field, and wherein the controller is configured to:

receive location data indicative of a position of the work vehicle and the row unit within the field during the current planting operation; and instruct the work vehicle to decrease the speed and the row cleaner blade to increase the downward force based on determination of the position of the work vehicle or the row cleaner blade being within one of the respective areas of high residue.

17. The system of claim 13, wherein the controller is configured to:

receive satellite data indicative of field conditions during the current planting operation;

and instruct the work vehicle to adjust the speed, the row cleaner blade to adjust the downward force, or both based on the satellite data and the historical harvest data.

18. The system of claim 17, comprising a display configured to display image data, wherein the controller is configured to:

generate a map based on a comparison of the satellite data and the historical harvest data; and instruct the display to display the map.

19. The system of claim 13, comprising a display configured to receive an operator input, wherein the controller is configured to:

receive the operator input via the display, wherein the operator input is indicative of target operating parameters, the target operating parameters comprising a target speed of the work vehicle, a target downward force applied by the row cleaner blade, or both;

receive a signal indicative of operating parameters during the current planting operation from one or more sensors, the operating parameters comprising the speed of the work vehicle, the downward force applied by the row cleaner blade, or both; and instruct the row unit or the work vehicle to adjust the operating parameters based on a comparison between the target operating parameters and the operating parameters.

20. The system of claim 1, wherein the controller is configured to:

determine, based on the sensor data, a position of the work vehicle within the field relative to the respective areas of high residue and the respective areas of low residue;

increase the pressure applied by the row cleaner by a threshold amount based on the position of the work vehicle being within a high residue area of the respective areas of high residue; and subsequently decrease the speed of the work vehicle after increasing the pressure applied by the row cleaner by the threshold amount based on the position of the work vehicle being within the high residue area of the respective areas of high residue.

* * * * *